United States Patent [19]

Bauer

[11] 4,417,867
[45] Nov. 29, 1983

[54] DOUGH FORMING MOLD ASSEMBLY

[75] Inventor: Marshall Bauer, Chicago, Ill.

[73] Assignee: Nation Enterprises, Inc., Chicago, Ill.

[21] Appl. No.: 384,044

[22] Filed: Jun. 1, 1982

Related U.S. Application Data

[63] Continuation-in-part of Ser. No. 270,510, Jun. 4, 1981.

[51] Int. Cl.³ .................. B29C 1/00; A21C 11/00
[52] U.S. Cl. .................. 425/394; 425/398; 425/406; 425/457
[58] Field of Search ........... 425/398, 457, 383, 394, 425/399, 403, 801, 812, 397, 406; 264/DIG. 34

[56] References Cited

U.S. PATENT DOCUMENTS

| | | | |
|---|---|---|---|
| 1,190,072 | 7/1916 | Aiken | 425/812 |
| 1,548,537 | 8/1925 | MacDonald | 425/801 |
| 1,870,062 | 8/1932 | Moore | 425/398 |
| 1,929,737 | 10/1933 | Fischer | 425/812 |
| 1,989,724 | 2/1935 | Villanyi | 425/398 |
| 1,991,588 | 2/1935 | Waterman | 425/398 |
| 2,276,321 | 3/1942 | Lindahl | 264/DIG. 34 |
| 2,296,744 | 9/1942 | Simmons | 425/812 |
| 2,347,972 | 5/1944 | Scott et al. | 264/DIG. 34 |
| 3,124,083 | 3/1964 | Atwood | 425/812 |
| 3,137,038 | 6/1964 | Maynard | 425/812 |
| 3,195,423 | 7/1965 | Carter | 425/398 |
| 4,057,380 | 11/1977 | Hosoe | 425/398 |
| 4,149,841 | 4/1979 | Patterson | 425/398 |

FOREIGN PATENT DOCUMENTS 466881 8/1975 U.S.S.R. .................. 425/398

*Primary Examiner*—Willard E. Hoag
*Attorney, Agent, or Firm*—Michael G. Berkman

[57] ABSTRACT

A mold assembly for forming a dough mass into a unique pizza shell. The shell is characterized in that it is not merely a flat sheet, but consists essentially of a planar base sheet bounded by a circumambient, integrally-formed, upstanding marginal dam or edge. The mold assembly, which includes intercoupling pizza-shell-forming platen and matrix means, carries heater means in the platen for applying heat to the contacting face of the dough mass during compression shaping thereof thereby partially to cure and thus to fix or set the dough in its ultimate converted configuration.

1 Claim, 5 Drawing Figures

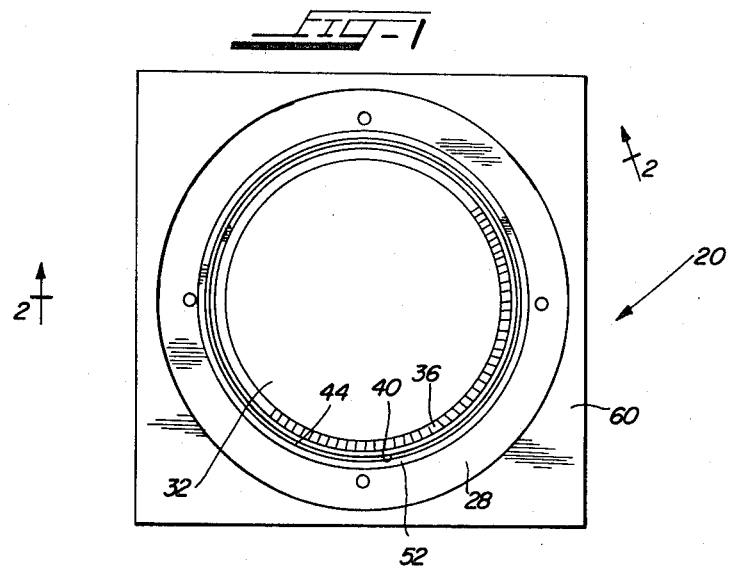
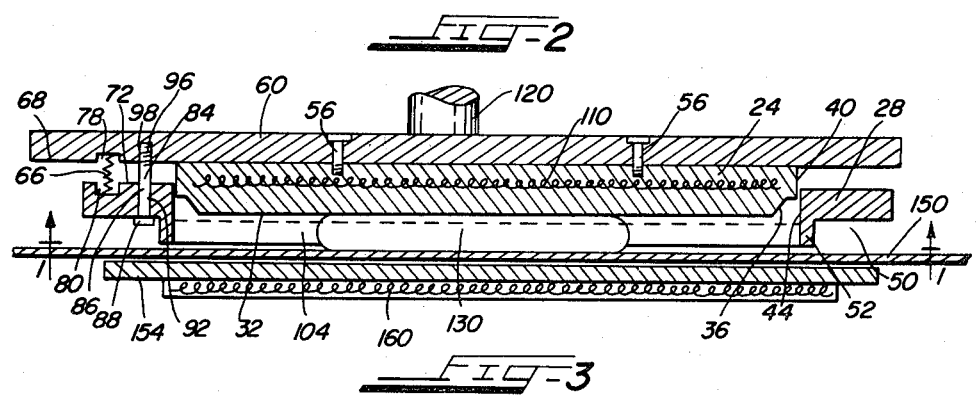
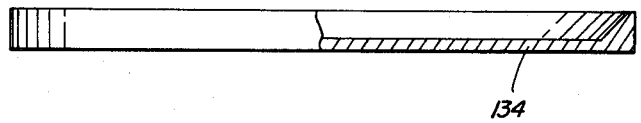

DOUGH FORMING MOLD ASSEMBLY

This application is a continuation-in-part of a co-pending U.S. Pat. application Ser. No. 06/270,510 filed June 4, 1981. The entire disclosure of that application is hereby incorporated by reference herein to the extent it is not inconsistent herewith.

BACKGROUND OF THE INVENTION

The present invention relates to a dough-molding or forming assembly for converting a food product into a predetermined final physical configuration. More particularly, the invention is directed to a pizza-molding assembly for converting a dough mass into a pizza shell characterized in that the shell constitutes an essentially flat base sheet bounded by an integrally formed circumambient upstanding marginal edge or rim.

Heretofore, it has been the practice, in the commercial preparation of pizza shells, to form those shells as essentially flat sheets of dough. Flat dough configuration is the rule both for commercially produced automatically fabricated pizza shells as well as those which are "handmade". A long-recognized problem in applying foodstuffs including sauces and cheeses to pizza shells is that these coating materials often "escape" beyond the edge or areal limits of the physical shell or sheet itself onto the oven shelf or the other structure on which the shell is supported during the baking process. It will be appreciated that such loss of coatings and the concurrent "contamination" of the baking surface are objectionable.

The problem described is one which has long plagued the pizza industry. While extensive efforts have been made toward effectively and simply resolving this problem, no satisfactory solution has heretofore been provided. It is, therefore, to the effective resolution of this problem and a simple pizza-forming apparatus and an improved pizza shell produced thereby that the present invention is directed.

SUMMARY OF THE INVENTION

It is a principal feature of the present invention that there is provided an improved mold assembly of relatively simple but of highly effective configuration and construction which functions to convert a dough mass into a pizza shell of improved physical form.

Specifically, it is an important feature of the present invention that the molding assembly acts upon a dough mass to convert that mass into a pizza shell having a substantially flat base sheet to which is integrally joined at a radially bounding edge thereof an upstanding rim, edge, or dam.

The subject invention finds particular utility in the formation of pizza shells which have the important feature of precluding the "escape" of the coating materials such as the melted cheese components laterally from the pizza shell during the cooking or baking process.

In accordance with the practice of the invention, a mass of dough is subjected to pressure while confined within a restricting cavity so that the applied pressure causes the mold mass to fill and permeate the cavity and, ultimately, to assume the internal spatial configuration defined by the cavity bounding walls.

In a preferred embodiment of the method of the invention, the technique includes features promoting a continuous assembly line operation in which longitudinally spaced and propelled masses of dough are aligned, sequentially, and delivered, in turn, to a superimposed mold assembly so that the assembly bears against the dough mass and acts upon it so as to transform that mass into the improved pizza shell configuration of the invention. The same mold assembly then acts on each dough mass as each reaches the molding station, in turn.

In a preferred embodiment of the invention, the mold assembly includes interengaging platen and matrix means, which, in combination with a supporting substrate on which the mold mass is carried, define the ultimate internal configuration or cavity into which the dough mass is forcibly intruded during the molding process.

It is a related feature of the improved mold assembly of the invention that the platen carries heating elements which heat the dough-contacting surface of the platen thereby to set the dough in the configuration assumed upon its compression. In a preferred embodiment of the method of the invention, the substrate upon which the dough mass is supported during the molding process is also heated further to enhance the setting of the dough during the molding process.

A related feature of the method of the invention is that each dough mass is selectively "portioned", so that, upon compression in the mold assembly, it substantially fills the available ultimate cavity defined in the molding process and so that there is essentially no "overrun" from the module as each is subjected to the molding step. Accordingly, there is no need to recover any "excess" of dough or to return any such excess for reprocessing.

A related important feature of the method of the invention is that there is no need manually to handle the dough mass either prior to its subjection to the molding process, or during the molding process, or upon completion of the molding process as the formed pizza shell then goes to the next processing station.

Other and further objects, features, and advantages of the invention will become evident upon the reading of the following specification taken in conjunction with the drawing.

FIG. 1 is a bottom plan view of the mold assembly of the invention, showing the nesting, slidably interengaging platen and matrix components and the supporting plate to which these elements are secured;

FIG. 2 is an enlarged cross sectional view taken substantially on the line 2—2 of FIG. 1 and showing the combination platen and matrix mold assembly superimposed over the dough mass, the latter being supported on the substrate which in combination with the platen and the matrix define the cavity which the compressed dough mass ultimately permeates;

FIG. 3 is an elevational view, partly in section, of the novel pizza shell of the invention;

DESCRIPTION OF THE PREFERRED EMBODIMENT

Figure 4:
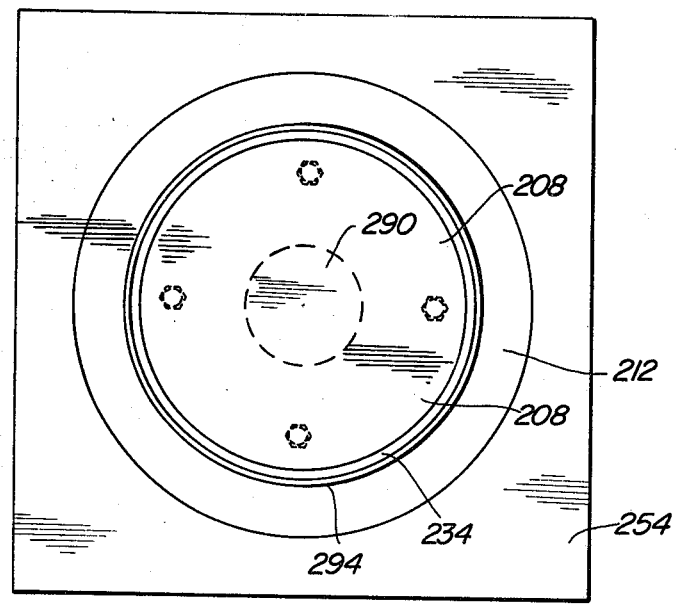
FIG. 4 is a bottom plan view of a second embodiment of a pizza shell forming mold, in accordance with the invention.

The aims and objects of the invention are accomplished by providing in a mold assembly including a platen and a cooperating matrix, a compression cavity contoured to establish as a component of a pizza shell produced by compression molding of a dough mass an integrally formed circumscribing rim, rib or dam which functions to prevent pizza coating materials, including the melted cheese, from flowing beyond the physical lateral limits of the pizza shell. The improved pizza shell of the invention facilitates and accelerates the pizza "coating" step and also obviates objectionable deposition of pizza-coating materials on the shelf of the pizza oven during the baking process.

Referring now to the drawings, and more particularly to FIG. 2, there is shown one preferred embodiment of the dough forming mold assembly of the invention provided for illustrative purposes and not to be construed in any limiting sense. The mold assembly 20 consists, in the preferred embodiment illustrated, of several distinct mechanical components. As best seen in FIG. 2, these components include a piston-like platen 24 and a ring-like or cylinder-like matrix 28. The platen 24 is provided with a substantially flat pressure face 32, the face 32 being cut away at its encircling marginal periphery to define a trough 36 which opens outwardly of the platen 24.

The platen 24 is so dimensioned diametrically as to be slidably received within the matrix 28 in sleeve-like inter-engagement so that the bounding vertical wall 40 defining the outer radial limit of the platen 24 is movable axially into the matrix 28 in close proximity to the inner wall 44 of the ring matrix 28.

At its base the ring matrix 28 is cut away 50 to provide a residual annular extension 52 which serves as a mechanical stop for the mold assembly 20 as it is brought to bear on a supporting substrate, in use.

Surmounting the platen 24 and secured thereto by means of threaded bolts 56 is a platen support plate 60. The support plate 60 extends radially beyond the limits of the platen, as clearly shown in FIG. 2.

Spacer means, in the form of spring means 66 are interposed between the undersurface 68 of the support plate 60 and the top surface 72 of the ring matrix 28. In the particular embodiment of the invention shown, the springs 66 seat within and are retained in place by means of axially in line bores 78 and 80 formed in the undersurface of the support plate 60 and in the opposed upper surface of the ring matrix 28.

The support plate 60 and the platen 24 carried thereby are secured to the ring matrix 28 by means of a plurality of threaded bolts 84. In the specific illustrative physical arrangement depicted, the bolts 84 include shank portions 86 adjacent the bolt head 88. The shank portions 86 extend slidably through cooperating bores 92 formed in and extending axially through the ring-like matrix 28. The ends 96 of the bolts 84 are threaded 98 and are received in cooperating threaded orifices formed in the support plate 60. It will be appreciated that in the arrangement described, upon the application of compressive forces downwardly upon the support plate 60, the plate is free to move axially downwardly, against the biasing opposing spring pressure of the spring 66, toward the matrix ring 28, with concurrent intrusive penetration of the platen 24 into the mold cavity 104 bounded by the ring matrix 28. Any other suitable mechanical arrangement for biasing the platen outwardly of while permitting the platen to invade or to intrude into the cavity 104 may be employed.

The platen 24 is provided with electrical heating means 110 energized by a conventional power supply (not shown).

Surmounting and secured to the support plate 60 is a shaft 120 for attachment to a hydraulic drive assembly (not shown) for effecting the downward and retractive movement of the mold assembly 20 during the dough mass shaping operation.

In addition to the dough forming mold assembly 20 described, FIG. 2 also illustrates additional apparatus which, though not part of the instant invention, is used in conjunction with the mold of the invention. As previously explained, the mold assembly 20 of the invention acts upon a ball-like mass of dough 130 to transform that mass into the improved pizza shell 134 of the invention (FIG. 3). While any means including mere manual placement may be used for positioning the dough mass 130 in place so that it may be acted upon by the mold assembly 20, in a preferred automated procedure, the masses of dough 130 to be made into pizza shells are transported on a moving belt 150 on which the discrete dough masses 130 have previously been placed in a linear sequential array. Each dough mass 130, in turn, reaches the station at which the mold 20 of the invention is located. The travel of the moving steel belt or sheet 150 is temporarily interrupted when the dough mass 130 is in vertical alignment with the platen and matrix elements of the mold assembly 20. At this molding station, the steel belt 150 rides upon and is supported by a metal substrate 154 of substantial mass and stability so that the steel sheet 150 itself is supported firmly against the compression forces exerted on by the mold during the shaping of the dough mass 130. The under plate 154 is also provided with electrical heating elements 160 so that curing or setting thermal energy may be applied to the undersurface of the dough mass 130 at the time of the compression thereof. Typically, the dough sheet may be from about 2 to about 7 mm thick, and the edge may be about 8 to 12 mm high.

With the dough mass compressed to diffuse within and to fill the confining cavity 104, and upon the application of curing heat to the formed shell for a period of up to, for example, about five seconds, the shaft 120 is raised and the mold assembly is retracted upwardly, whereupon the moving belt 150 continues on its predetermined course to convey the shaped shell 134 beyond the mold assembly stop and toward the next processing station. At the same time, the next-in-line dough mass 130 is brought into vertical correspondence with the mold assembly 20, and the forming cycle is repeated.

Figure 5:
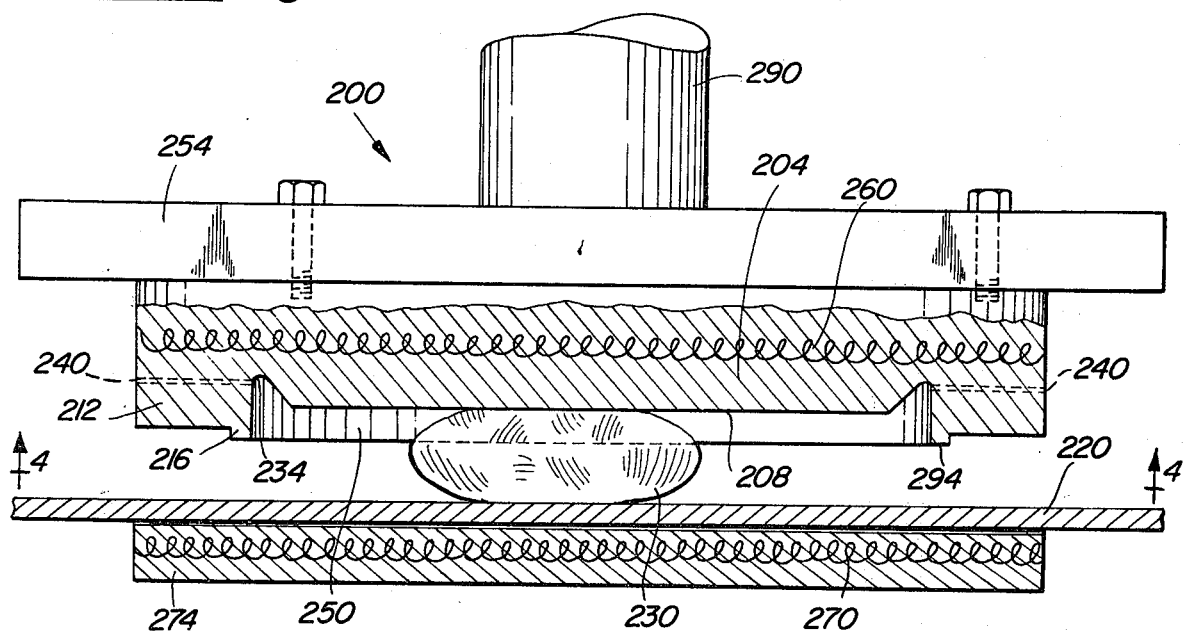
FIG. 5 is an enlarged cross-sectional view taken substantially on the line 5—5 of FIG. 4.

A second, somewhat simplified embodiment of the invention is illustrated in FIGS. 4 and 5. As shown in FIG. 5, the dough-shaping matrix 200 consists of generally dish-shaped mold or sheet 204 having a substantially flat base 208 integrally formed with a generally transversely extending dough-confining ring 212. The ring 212 is preferably formed with a co-extensive concentric annular bead or band 216 for establishing a positive and firm mechanical engagement with a substrate 220 therebeneath when the dough shaping process is carried out on a dough mass 230 interposed between the substrate 220 and the overlying matrix 200.

The matrix 200 is formed at a junction of an inside surface of the dough-confining ring 212 and the flat face 208 with an endless perimetric moat-like groove 234 which circumscribes the flat, central base 208. It is pressure-forced intrusion of the dough mass 230 into the groove 234 during compression of the dough that produces the novel bead-like rim 238 about the formed pizza shell has the latter is fabricated in accordance with the invention.

Air passage or air escape ducts or channels 240 formed in the matrix 200 provide fluid communication between the annular moat or groove 234 and ambient atmosphere facilitate the escape of air entrapped within the dough-molding cavity 240 during sealing closure of the matrix 200 against the dough-supporting sheet or substrate 220.

The matrix 200 is fastened to and surmounted by a mounting plate 254 housing a heater assembly 260 energized by a conventional power supply (not shown). A similar heating assembly 270 is contained within an underplate 274 which underlies the dough mass supporting sheet 220. As in the first embodiment of the invention, the upper, vertically shiftable structure of the dough molding apparatus, including the mounting plate 254, is raised and lowered mechanically (or hydraulically) by means of a shaft 290 secured to and surmounted the mounting plate 254 —all as described in foregoing sections of these specifications.

It is within the concepts and contemplations of the present invention that the overall dimensions and size of the apparatus are not critical. Rather, the apparatus of the invention may be dimensioned to produce pizza shells of various sizes, for example, shells from about 7 inches to about 16 inches in diameter. Other parameters of the molding apparatus may also vary according to the particular requirements of the user. For example, a preferred pizza shell may be formed with apparatus in which the rim-defining groove is about ⅜-inch overall in depth, as measured from the edge face 294 of the annular band 216. In this embodiment of the apparatus, the distance from the base 208 to the face of the band 294 is about 3/16 inch. The pizza shell 300, as produced in accordance with the practice of the present invention, has a general appearance corresponding to that illustrated schematically in FIG. 3.

While the present invention has been described with respect to a preferred embodiment and with reference to specific structural arrangements, and an illustrative application, the invention is not to be narrowly construed. For example, while a particular mechanical arrangement has been described for impressing the mold forming elements upon the dough mass, it is contemplated that other arrangements, not inventive in the light of the present disclosure, may be utilized. Additionally, while heating periods have been designated, it will be appreciated that these too may be varied depending upon the temperature of the heating plates and the particular formulation and composition of the dough mass itself. Although it is contemplated that in a preferred practice of the invention the mechanisms involved in transporting the dough masses and in actuating the press assembly will be substantially automatic, each operation may, if preferred, be carried out individually and manually. For purposes of illustrative disclosure, the final pizza shell has been described with reference to a preferred thickness and well as with reference to a typical height of the surrounding bead or rim. Such dimensions are in no sense critical, but are provided merely for completeness of disclosure of a preferred embodiment.

From the foregoing, it is to be understood that the shell-forming assembly of the invention is capable of modification, and that such modifications may be made without departure from the spirit or scope of the invention as defined in the appended claims.

What is claimed is:

1. A dough-molding apparatus for dough-shaping, functional, positive compressive coaction in cooperation with planar platen for transforming a deformable mass of dough into a generally dish-like sheet defining a substantially flat base integrally formed with an upstanding circumambient bead-like rim, said dough-molding apparatus comprising a dough-confining ring, a generally planar pressure plate spanning interiorly of and bounded and integral with said ring, said ring including a wall portion projecting normally of a dough-presented, dough-engaging face of said plate extending beyond said face and abuttingly engaging a flat dough-mass-supporting substrate, said dough-molding apparatus being formed at a juncture of an inside surface of said ring and said plate with an endless perimetric moat-like groove invading said plate and circumscribing a flat central zone thereof, air passage means formed in said ring and communicating between said moat-like groove and ambient atmosphere for facilitating escape of air trapped within walls defining a dough-molding cavity delineated by said dough-molding apparatus and said floor-like dough-mass-supporting substrate therebeneath.

* * * * *